(12) United States Patent
Wang et al.

(10) Patent No.: US 11,371,874 B2
(45) Date of Patent: Jun. 28, 2022

(54) METHOD AND APPARATUS FOR MEASURING MASS BASED ON TORQUE EQUILIBRIUM

(71) Applicant: Beijing Aerospace Institute for Metrology and Measurement Technology, Beijing (CN)

(72) Inventors: Xiaosan Wang, Beijing (CN); Fengju Sun, Beijing (CN); Lei Yan, Beijing (CN); Tian Bai, Beijing (CN)

(73) Assignee: Beijing Aerospace Institute for Metrology and Measurement Technology, Beijing (CN)

( * ) Notice: Subject to any disclaimer, the term of this patent is extended or adjusted under 35 U.S.C. 154(b) by 379 days.

(21) Appl. No.: 16/684,558

(22) Filed: Nov. 14, 2019

(65) Prior Publication Data
US 2020/0158558 A1 May 21, 2020

(30) Foreign Application Priority Data
Nov. 15, 2018 (CN) .......................... 201811359728.8

(51) Int. Cl.
| | | |
|---|---|---|
| *G01G 1/24* | (2006.01) | |
| *G01G 7/02* | (2006.01) | |
| *G01G 21/23* | (2006.01) | |
| *G01G 21/28* | (2006.01) | |
| *G01M 1/12* | (2006.01) | |
| *G01L 3/22* | (2006.01) | |

(52) U.S. Cl.
CPC .............. *G01G 1/246* (2013.01); *G01G 7/02* (2013.01); *G01G 21/235* (2013.01); *G01G 21/28* (2013.01); *G01M 1/122* (2013.01); *G01L 3/22* (2013.01)

(58) Field of Classification Search
CPC .......... G01G 1/246; G01G 7/02; G01G 21/28; G01G 21/235; G01L 3/22; G01M 1/122
See application file for complete search history.

(56) References Cited

U.S. PATENT DOCUMENTS

| | | | | |
|---|---|---|---|---|
| 3,685,604 A | * | 8/1972 | Smith .................... | G01G 21/02 177/184 |
| 4,274,501 A | * | 6/1981 | Gallo ................... | G01G 21/161 177/210 FP |
| 5,442,960 A | * | 8/1995 | Solberg, Jr. .............. | G01G 3/16 73/580 |

FOREIGN PATENT DOCUMENTS

| | | |
|---|---|---|
| CN | 102692264 B | 2/2014 |
| CN | 102914351 B | 1/2015 |
| CN | 107907272 A | 4/2018 |

(Continued)

*Primary Examiner* — Natalie Huls

(57) ABSTRACT

A method and an apparatus for measuring mass based on torque equilibrium, including a main blade for supporting and balancing a lever and parts arranged on the lever; a displacement measuring device for measuring a position of the lever; an electromagnetic torquer for balancing the apparatus after a balance weight is coarsely loaded during measuring; a product tooling on which a product to be measured is arranged and fixedly connected. The product tooling is fixed on a slider which freely slides along a guide rail; a locking block is provided to lock the product after the product slides in place; the guide rail is fixed on the level; a laser displacement sensor is provided to measure a displacement of the product along the guide rail; a lifting mechanism is provided to lift the lever and parts arranged on the lever to separate from the main blade.

10 Claims, 5 Drawing Sheets

(56) References Cited

FOREIGN PATENT DOCUMENTS

EP 0644407 A3 5/1995
KR 102167080 B1 * 10/2020

* cited by examiner

METHOD AND APPARATUS FOR MEASURING MASS BASED ON TORQUE EQUILIBRIUM

CROSS-REFERENCE TO RELATED APPLICATIONS

This application claims the benefit of priority from Chinese Patent Application No. 201811359728.8, filed on Nov. 15, 2018. The content of the aforementioned application, including any intervening amendments thereto, is incorporated herein by reference in its entirety.

TECHNICAL FIELD

The present application relates to mass measuring, more particularly, to a method and an apparatus for measuring mass based on torque equilibrium.

BACKGROUND OF THE INVENTION

Mass, as a basic property of a product as well as a basic physical quantity of the International System of Units, defines physical quantities such as force, torque, center of mass, and moment of inertia, and these important physical quantities are the derived quantities of the mass. The force, torque, center of mass, and moment of inertia are the main physical quantities monitored in the aeronautics and astronautics, and the improvement of the mass measurement accuracy will contribute to a more accurate measurement of the important physical quantities, and thus the accuracy of the measurement result and value transfer is ensured.

The parameters of the mass property of the product (mass, center of mass, moment of inertia, product of inertia) are the important fight parameters of the aircraft; some pieces to be measured can be easily weighed separately on weighing equipment such as electronic balances, electronic scales, etc. if the size of the piece is small, but for some pieces to be measured, all the physical parameters are required to be obtained in one-time fitting due to the structural reason. Some measuring equipment can obtain the mass and the center of mass in one-time fitting, and the moment of inertia and product of inertia are obtained by another equipment. As shown in FIG. 1, three load cells A, B, C are evenly provided on the bottom of the measuring table 2; the mass of a product is calculated according to m=(mA1+mB1+mC1)−(mA2−mB2−mC2), where mA1, mB1, mC1 are the indications of the three load cells before loading the product, respectively, and the mA2, mB2, mC2 are the indications of the three load cells after loading the product, respectively. The accuracy of the measurement, typically up to 0.03%, mainly relies on the precision of the load cell.

SUMMARY OF THE INVENTION

The present application is to achieve high-accuracy measurement for mass of products to be measured in one-time fitting based on torque equilibrium.

The technical solutions of the present application are as follows:

The present invention provides an apparatus for measuring mass based on torque equilibrium, comprising:

a main blade for supporting and balancing a lever and parts arranged on the lever;

a displacement measuring device for measuring a position of the lever;

an electromagnetic torquer for balancing the apparatus after a balance weight is coarsely loaded during measuring;

a product tooling on which a product to be measured is arranged and fixedly connected;

where the product tooling is fixed on a slider which freely slides along a guide rail; a locking block is provided to fixedly lock the product after the product slides in place; the guide rail is fixed on the level; a laser displacement sensor is provided to measure a displacement of the product along the guide rail; a lifting mechanism is provided to lift the lever and the parts arranged on the lever to separate from the main blade; a load cell is provided above the lifting mechanism and is configured to measure mass and center of mass of the product, such that the balance weight with an appropriate mass is loaded by an automatic loading system; and a minor blade is provided to provide an accurate loading point for the balance weight.

In some embodiments, the apparatus further comprises a main fixed base and a side fixed base; where the side fixed base is arranged at a side of the main fixed base, and the automatic loading system is arranged at the other side of the main fixed base;

the main blade is provided at a center of the main fixed base, and two lifting mechanisms are provided on both sides of the main fixed base;

the electromagnetic torquer is mounted on the side fixed base;

the laser displacement sensor is mounted on an end of the lever and levels with the product tooling; and the minor blade is arranged right above the balance weight.

Further, the present invention provides a method for measuring mass based on torque equilibrium, comprising:

1) mounting the product tooling on the slider;

2) lowering the lifting mechanism and balancing the product tooling using the balance weight and the electromagnetic torquer, wherein a balancing load is represented by $m_1$, and the balanced product tooling is at an initial position;

3) moving the product tooling along the guide rail for a distance; locking the product tooling by the locking block; measuring the distance to obtain a displacement distance $L_1$; and balancing the product tooling, wherein a balancing load is represented by $m_2$;

4) calculating the mass of the product tooling according to $$M_t = \frac{(m_2 - m_1) \cdot L}{L_1},$$

wherein L represents the horizontal distance between blade marks of the main blade and minor blade, and the $M_t$ represents the mass of the product tooling;

5) starting the lifting mechanism to lift the lever; restoring the product tooling to the initial position; fixing the product on the product tooling; and coarsely measuring mass of the product to obtain a coarsely measured mass M';

6) lowering the lifting mechanism and balancing the product tooling, where a balancing load is represented by $m_3$;

7) moving the product tooling along the guide rail for a distance; locking the product tooling by the locking block; measuring the distance to obtain a displacement distance $L_2$;

8) coarsely loading the balance weight until the apparatus is within a controllable range of the electromagnetic torquer, where a balancing load is represented by $m_4$;

9) calculating the sum of the mass of the product tooling and the product according to $$M + M_t = \frac{(m_3 - m_4) \cdot L}{L_2},$$

where M is the mass of the product;

10) calculating the mass of the product according to $$M = \frac{(m_3 - m_4) \cdot L}{L_2} - \frac{(m_2 - m_1) \cdot L}{L_1}$$

In the step 1), the product tooling is fixed by the locking block.

In the step 1), the product tooling is mounted on the slider when the lifting mechanism jacks up.

In the step 3), the displacement distance $L_1$ is measured by the laser displacement sensor.

In the step 7), the displacement distance $L_2$ is measured by the laser displacement sensor.

In the step 8), the balance weight is coarsely loaded by the automatic loading system according to center of mass coarsely measured by the load cell.

In the step 3), the product tooling is balanced by the balance weight and the electromagnetic torquer.

In the step 5), the coarsely measured mass M' of the product is measured by the load cell.

In the step 6), the product tooling is balanced by the balance weight and the electromagnetic torquer.

The beneficial effects of the present application are as follows.

The mass and the center of mass of the product may be simultaneously measured by the apparatus based on torque equilibrium, such that the operations such as re-lifting and transferring the product to other measuring equipment, etc. are avoided, thus improving the measuring efficiency.

REFERENCE NUMERALS

1, electromagnetic torquer; 2, displacement measuring device; 3, laser displacement sensor; 4, guide rail; 5, product tooling; 6, main blade; 7, product; 8, lifting mechanism; 9, balance weight; 10, automatic loading system; 11, load cell; 12, lever; 13, locking block; 14, slider; 15, minor blade; 16, main fixed base; 17, side fixed base.

DETAILED DESCRIPTION OF EMBODIMENTS

Figure 1:
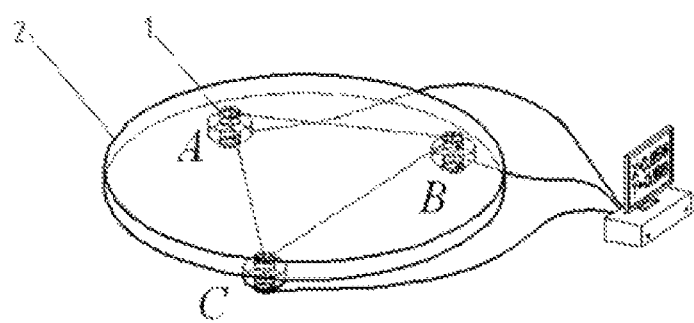
FIG. 1 is a schematic diagram of a load cell in the prior art.
Figure 2:
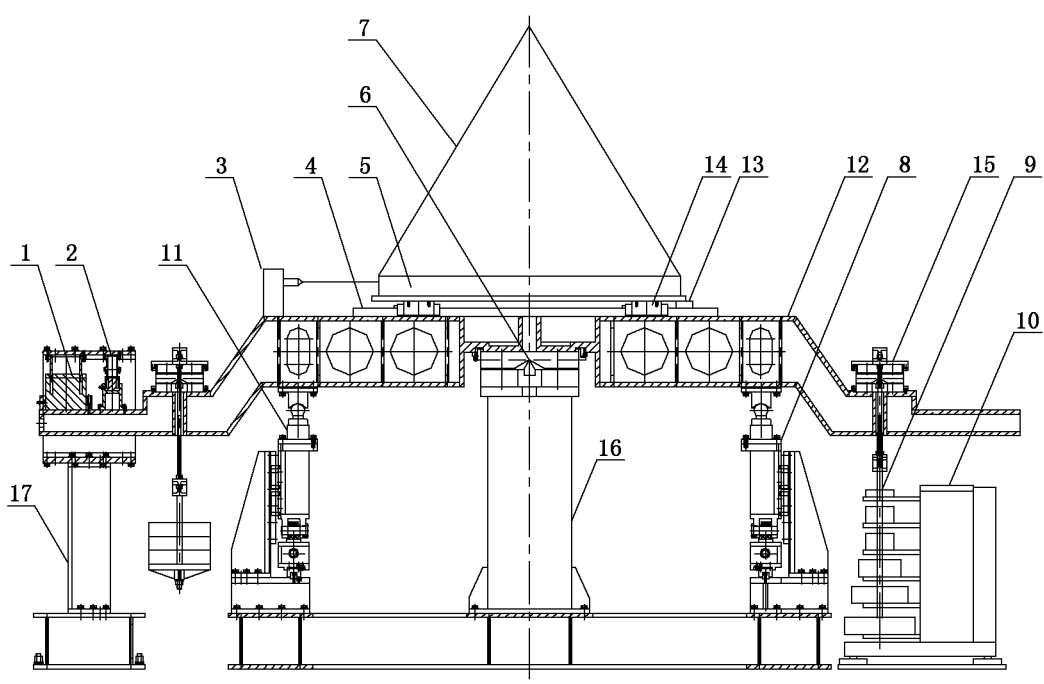
FIG. 2 is a schematic diagram of an apparatus for measuring mass based on torque equilibrium of the present application.
Figure 3:
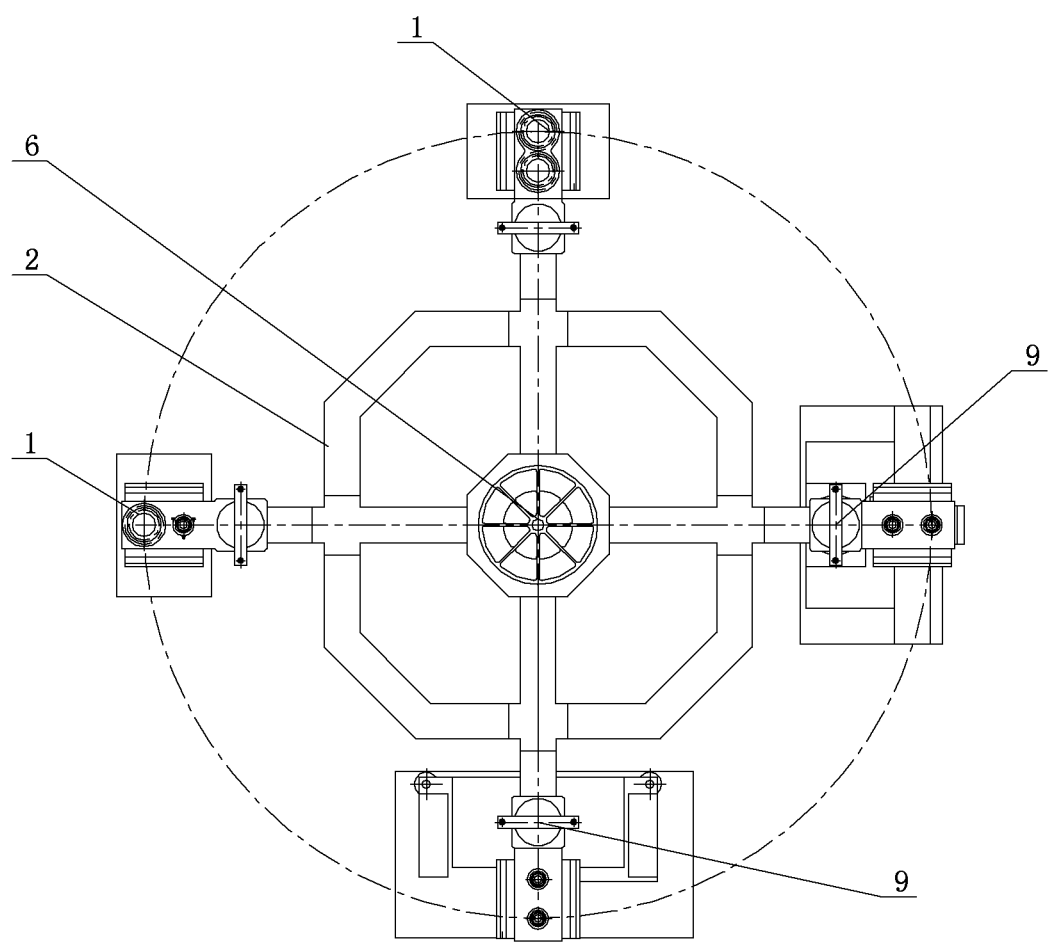
FIG. 3 is a top view of the apparatus for measuring mass based on the torque equilibrium of the present application.

As shown in FIGS. 2-3, this embodiment provides an apparatus for measuring mass based on torque equilibrium, comprising: a main blade 6 for supporting and balancing a lever 12 and parts arranged on the lever; a displacement measuring device 2 for measuring a position of the lever 12; an electromagnetic torquer 1 for balancing the apparatus after a balance weight 9 is coarsely loaded during measuring; and a product tooling 5 on which a product 7 to be measured is arranged and fixedly connected.

The product tooling 5 is fixed on a slider 14 which freely slides along a guide rail 4; a locking block 13 is provided to lock the product 7 after the product 7 slides in place; the guide rail 4 is fixed on the level 12; a laser displacement sensor 3 is provided to measure a displacement of the product 7 along the guide rail 4; a lifting mechanism 8 is provided to lift the lever 12 and the parts arranged on the lever to separate from the main blade 6; a load cell 11 is provided above the lifting mechanism 8 and is configured to measure mass and center of mass of the product 7, such that the balance weight 9 with an appropriate mass is loaded by an automatic loading system 10; and a minor blade 15 is provided to provide an accurate loading point for the balance weight 9.

Figure 5:
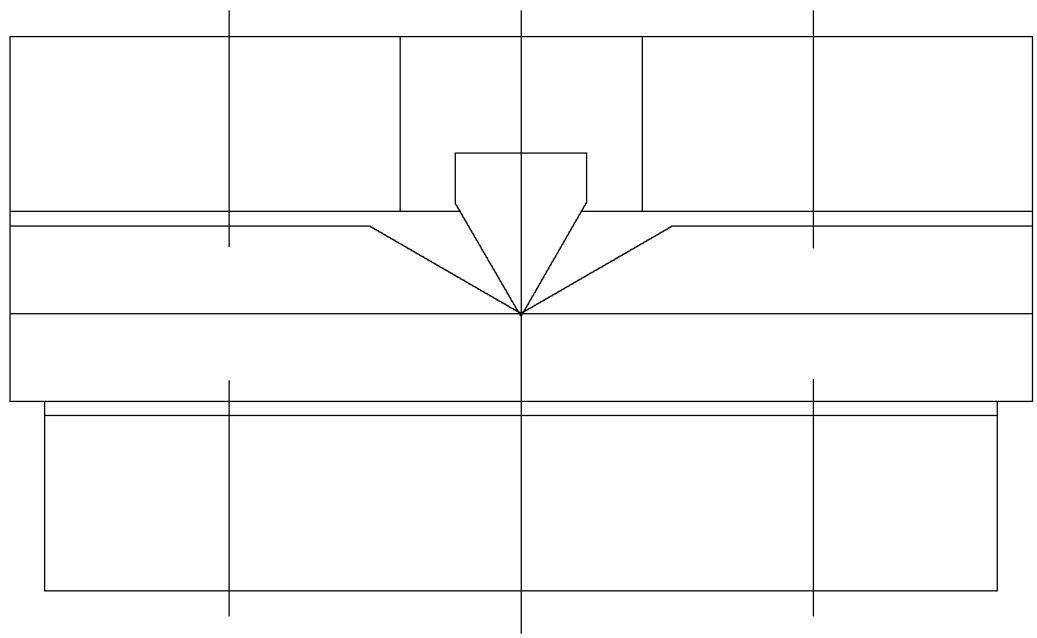
FIG. 5 is a schematic diagram of a main blade of the apparatus for measuring mass based on the torque equilibrium of the present application.
Figure 6:
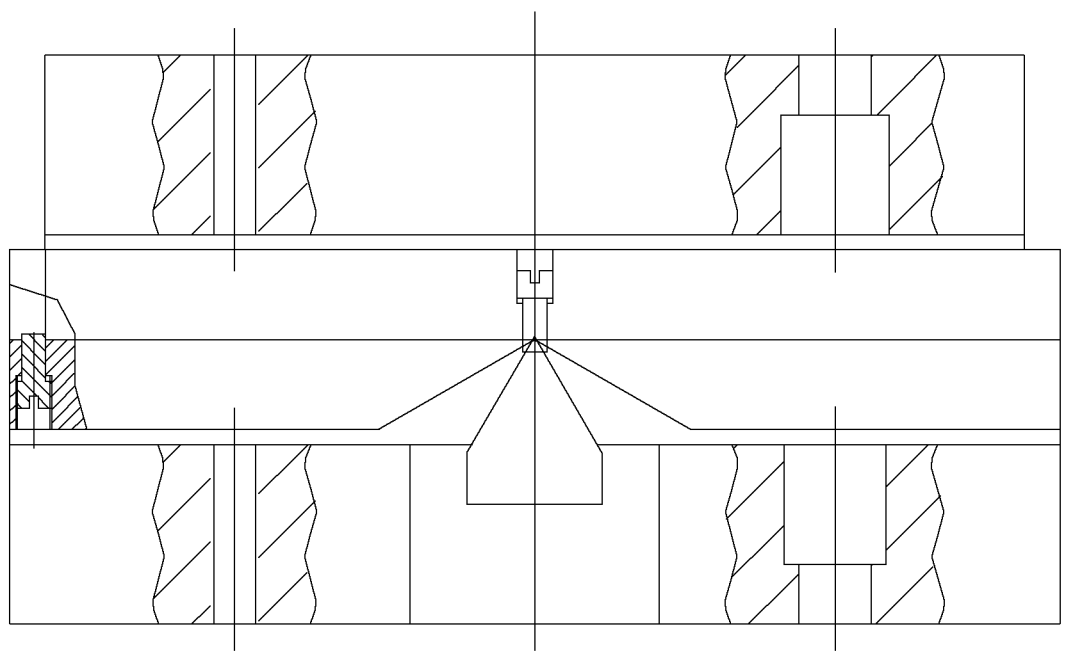
FIG. 6 is a cross-sectional view of the main blade of the present application.

As shown in FIGS. 5-6, the main blade 6 is provided at the center of a main fixed base 16, and the main blade 6 comprises a blade and a blade bearing and has a fixed blade mark. Two lifting mechanisms 8 are provided on both sides of the main fixed base 16. The parts arranged on the lever 12 comprise the guide rail 4, the slider 14, the locking block 13, the product tooling 5 and the product 7.

The displacement measuring device 2 is mounted on a side fixed base 17 and may adopts the displacement measuring device using the laser interference such as the Renishaw XL-80. The position of the lever 12 is measured by the displacement measuring device 2, and different signals are outputted by the displacement measuring device 2 based on the different inclination angles of the lever 12. The lever 12 is an irregular beam in nature, and the main blade 6 is located at the fulcrum of the lever 12. For example, when the left side is heavier, the lever 12 pivots to the left side around the main blade 6, a corresponding signal is outputted by the displacement measuring device 2. When the displacement measuring device outputs a voltage of a specified signal, the level is in a equilibrium position which allows the upper platform of the level to be horizontal. The equilibrium position is preset, i.e., the signal outputted by the displacement measuring device 2 is a preset value when when the lever 12 is horizontal.

During measuring, the displacement measuring device 2 determines whether the apparatus is balanced after the balance weight 9 is coarsely loaded, and an electric signal is sent by the displacement measuring device 2 to a control system to control the electromagnetic torquer 1, such that a force against the unbalanced force of the lever 12 is generated by the electromagnetic torquer 1 and balances the lever 12. Specifically, the electromagnetic torquer 1 needs to be mounted on the side fixed base 17 at a fixed position, where the fixed position has an accurate value being the horizontal distance between the force and the main blade 6, that is, the length of the moment arm, and the value is directly calculated into each balancing load. The balancing load is a combination of the mass of the balance weight and the force generated by the electromagnetic torquer 1; and the force of the electromagnetic torquer 1 needs to be converted into a mass on the position of the balance weight according to the length of the moment arm, such that the force is able to be added or subtracted with the mass of the balance weight.

After the product 7 is arranged on the product tooling 5, the product 7 is detachably fixed on the product tooling 5 via a hand screw or a snap structure. The product tooling 5 is fixed on the slider 14 which is able to freely slide on the guide rail 14, and the product 7 is locked by the locking block 13 after the product 7 slides in place. The locking block 13 may be in the form of a mechanical structure such as a screw-nut, a snap structure, or a concave-convex fit, which is not limited herein.

Figure 4:
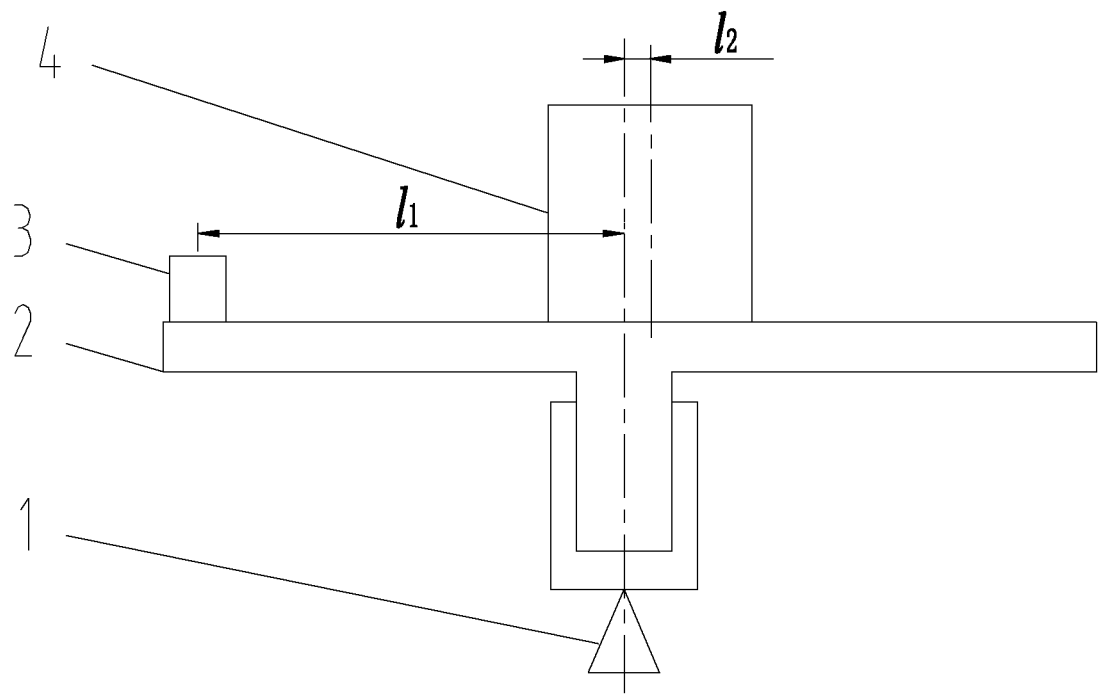
FIG. 4 is a close-up view of a part of the apparatus for measuring mass based on the torque equilibrium of the present application.

As shown in FIG. 4, the guide rail 4 is fixed on the upper surface of the lever 12 close to the product 7, and the laser displacement sensor 3 is mounted on an end of the lever 12 and levels with the product tooling 5. The displacement of the product along the guide rail 4 is measured by the laser reflection distance.

Specifically, the lifting mechanism 8 is a system that is able to jack upwards, and with the transmission of the motor and the speed reducer, a plurality of fulcrums, such as 4 fulcrums, are formed, and the fulcrums are synchronously raised upward or downward. The lever 12 and the parts arranged on the lever are lifted to separate from the main blade 6 by the lifting mechanism 8, meaning that the mass of the parts arranged on the lever is measured by the load cell 11 without the interference of the other parts. Moreover, the electromagnetic torquer 1 and the displacement measuring device 2 are of the non-contact type. Therefore, the product above the load cell 11 is supported by the load cell only when the mass of the product is being measured. The mass and the center of mass of the product are coarsely measured by the load cell 11 above the lifting mechanism 8 to allow the balance weight 9 with an appropriate mass being automatically loaded (i.e. hanged) by the automatic loading system 10. An accurate loading point for the balance weight 9 is provided by the minor blade 15. The minor blade 15 also comprises a blade and a blade bearing and has a fixed blade mark, and the balance weights are vertically loaded along the blade mark.

This embodiment further provides a method for measuring the mass, comprising the following steps:

1) the product tooling 5 is mounted on the slider 14 when the lifting mechanism 8 jacks up, and the product tooling 5 is fixed using the locking block 13;

2) the lifting mechanism 8 is lowered and the product tooling 5 is balanced using the balance weight 9 and the electromagnetic torquer 1, where the balancing load is represented by $m_1$, and the balanced product tooling is at an initial position;

3) the product tooling 5 moves along the guide rail 4 for a distance and is then fixed by the locking block 13, and a displacement distance $L_1$ is obtained by measuring the distance using the laser displacement sensor 3; and the product tooling 5 is balanced again by the balance weight 9 and the electromagnetic torquer 1, and the balancing load at this point is represented by $m_2$;

4) the mass of the product tooling 5 is calculated according to $$M_t = \frac{(m_2 - m_1) \cdot L}{L_1},$$

where L represents the horizontal distance between the blade marks of the main blade 6 and minor blade 15, and the $M_t$ represents the mass of the product tooling 5;

5) the lifting mechanism 8 is started to lift the level 12, so that the product tooling is restored to the initial position; the product 7 is fixed on the product tooling 5; and a coarsely measured mass M' is obtained by coarsely measuring the mass of the product 7 using the load cell 11;

6) the lifting mechanism 8 is lowered and the product tooling 5 is balanced by the balance weight 9 and the electromagnetic torquer 1, where the balancing load at this point is represented by $m_3$;

7) the product 7 is moved along the guide rail 4 for a distance and is then fixed by the locking block 13, and a displacement distance $L_2$ is obtained by measuring the distance using the laser displacement sensor 3;

8) the center of mass is coarsely measured by the load cell 11, and according to the measured center of mass, the balance weight 9 is coarsely loaded by the automatic loading system 10 until the apparatus is within a controllable range of the electromagnetic torquer 1, where the balancing load is represented by $m_4$;

9) the sum of the mass of the product tooling 5 and the product 7 is calculated according to $$M + M_t = \frac{(m_3 - m_4) \cdot L}{L_S} S,$$

where the mass of the product 7 is M; and 10) the mass of the product 7 is calculated according to $$M = \frac{(m_3 - m_4) \cdot L}{L_2} - \frac{(m_2 - m_1) \cdot L}{L_1}.$$

For the method for measuring the mass based on the torque equilibrium, in principle, the measurement of the mass is based on the mass of the balance weight and the displacement distance. For example, F2 balance weight has a accuracy of up to $1.6 \times 10^{-5}$. The displacement distance is measured by the laser displacement sensor with a high resolution, for example, when the displacement is 200 mm and the accuracy of the laser displacement sensor is 2 μm, the relative accuracy reaches up to $1.0 \times 10^{-5}$. The sensitivity of the main blade 6 which is the key component that affects the balancing performance can reach up to 1 g at the loading position. The influence of the sensitivity on the product is about 5 g according to the calculation of the moment arm, and the relative accuracy reaches up to $1.0 \times 10^{-5}$. Therefore, a combined result of these three key factors are about $1.0 \times 10^{-5}$, and the actual measurement results of the standard mass samples show that relative error % the of the mass measurement of the mass measuring apparatus does not exceed 0.01%, as shown in the table below.

| Number | Standard Mass (kg) | Actual Mass (kg) | Relative Error (%) |
| --- | --- | --- | --- |
| 1 | 100 | 99.995 | −0.005 |
| 2 | 500 | 499.964 | −0.0072 |
| 3 | 1000 | 999.945 | −0.0055 |
| 4 | 2000 | 1999.912 | −0.0044 |

Further, the apparatus for measuring mass based on the torque equilibrium realizes the measurement of the mass of a product on the basis of the measurement of the center of mass of the product. The remarkable effect of the method is that with the apparatus based on torque equilibrium, the mass and the center of mass of the product may be measured simultaneously rather than only measuring the mass of the product. The operations such as re-lifting and transferring the product to other measuring equipment, etc. are avoided in the present invention, such that the measuring efficiency is improved.

What is claimed is:

1. An apparatus for measuring mass based on torque equilibrium, comprising:
    a main blade for supporting and balancing a lever and parts arranged on the lever;
    a displacement measuring device for measuring a position of the lever;
    an electromagnetic torquer for balancing the apparatus after a balance weight is coarsely loaded during measuring;
    a product tooling on which a product to be measured is arranged and fixedly connected;
    wherein the product tooling is fixed on a slider which freely slides along a guide rail; a locking block is provided to fixedly lock the product after the product slides in place; the guide rail is fixed on the lever; a laser displacement sensor is provided to measure a displacement of the product along the guide rail; a lifting mechanism is provided to lift the lever and the parts arranged on the lever to separate from the main blade; a load cell is provided above the lifting mechanism and is configured to measure mass and center of mass of the product, such that the balance weight with an appropriate mass is loaded by an automatic loading system; and a minor blade is provided to provide an accurate loading point for the balance weight.

2. The apparatus of claim 1, further comprising a main fixed base and a side fixed base; wherein the side fixed base is arranged at a side of the main fixed base, and the automatic loading system is arranged at the other side of the main fixed base;
    the main blade is provided at a center of the main fixed base, and each of both sides of the main fixed base is provided with the lifting mechanism;
    the electromagnetic torquer is mounted on the side fixed base;
    the laser displacement sensor is mounted on an end of the lever and levels with the product tooling; and
    the minor blade is arranged right above the balance weight.

3. A method of using an apparatus for measuring mass based on torque equilibrium, the apparatus comprising:
    a main blade for supporting and balancing a lever and parts arranged on the lever;
    a displacement measuring device for measuring a position of the lever;
    an electromagnetic torquer for balancing the apparatus after a balance weight is coarsely loaded during measuring;
    a product tooling on which a product to be measured is arranged and fixedly connected;
    wherein the product tooling is fixed on a slider which freely slides along a guide rail; a locking block is provided to fixedly lock the product after the product slides in place; the guide rail is fixed on the lever; a laser displacement sensor is provided to measure a displacement of the product along the guide rail; a lifting mechanism is provided to lift the lever and the parts arranged on the lever to separate from the main blade; a load cell is provided above the lifting mechanism and is configured to measure mass and center of mass of the product, such that the balance weight with an appropriate mass is loaded by an automatic loading system; and a minor blade is provided to provide an accurate loading point for the balance weight;

the method comprising:
1) mounting the product tooling on the slider;
2) lowering the lifting mechanism and balancing the product tooling using the balance weight and the electromagnetic torquer, wherein a balancing load is represented by $m_1$ and the balanced product tooling is at an initial position;
3) moving the product tooling along the guide rail for a distance; locking the product tooling by the locking block; measuring the distance to obtain a displacement distance $L_1$; and balancing the product tooling, wherein a balancing load is represented by $m_2$;
4) calculating the mass of the product tooling according to $$M_t = \frac{(m_2 - m_1) \cdot L}{L_1},$$

wherein L represents the horizontal distance between blade marks of the main blade and minor blade, and the $M_t$ represents the mass of the product tooling;
5) starting the lifting mechanism to lift the lever; restoring the product tooling to the initial position; fixing the product on the product tooling; and coarsely measuring mass of the product to obtain a coarsely measured mass M';
6) lowering the lifting mechanism and balancing the product tooling, wherein a balancing load is represented by $m_3$;
7) moving the product tooling along the guide rail at a distance; locking the product tooling by the locking block; measuring the distance to obtain a displacement distance $L_2$;
8) coarsely loading the balance weight until the apparatus is within a controllable range of the electromagnetic torquer, wherein a balancing load is represented by $m_4$;
9) calculating the sum of the mass of the product tooling and the product according to $$M + M_t = \frac{(m_3 - m_4) \cdot L}{L_2},$$

wherein mass of the product is M; and
10) calculating the mass of the product according to $$M = \frac{(m_3 - m_4) \cdot L}{L_2} - \frac{(m_2 - m_1) \cdot L}{L_1}.$$

4. The method of claim 3, wherein in the step 1), the product tooling is mounted on the slider when the lifting mechanism jacks up.

5. The method of claim 3, wherein in the step 3), the displacement distance $L_1$ is measured by the laser displacement sensor.

6. The method of claim 3, wherein in the step 7), the displacement distance $L_2$ is measured by the laser displacement sensor.

7. The method of claim 3, wherein in the step 8), the balance weight is coarsely loaded by the automatic loading system according to center of mass coarsely measured by the load cell.

8. The method of claim 3, wherein in the step 3), the product tooling is balanced by the balance weight and the electromagnetic torquer.

9. The method of claim 3, wherein in the step 5), the coarsely measured mass of the product is measured by the load cell.

10. The method of claim 3, wherein in the step 6), the product tooling is balanced by the balance weight and the electromagnetic torquer.

\* \* \* \* \*